United States Patent [19]

O'Brien, Jr.

[11] 4,276,072
[45] Jun. 30, 1981

[54] OPTICAL FIBER FABRICATION

[75] Inventor: Brian O'Brien, Jr., Fabyan, Conn.

[73] Assignee: International Telephone and Telegraph Corporation, New York, N.Y.

[21] Appl. No.: 804,208

[22] Filed: Jun. 7, 1977

[51] Int. Cl.$^3$ .............................................. C03B 37/01
[52] U.S. Cl. ...................................... 65/3 A; 65/157; 65/169; 264/81; 427/163; 427/167; 427/237
[58] Field of Search ................. 65/DIG. 7, 374 R, 24, 65/26, 121, 32, 3 A, 18, 144, 157, 169; 264/1, 81; 427/163, 167, 237; 156/613; 118/724, 725

[56] References Cited

U.S. PATENT DOCUMENTS

| | | | |
|---|---|---|---|
| 1,628,417 | 5/1927 | Miller | 65/23 X |
| 2,292,826 | 8/1942 | Devers | 65/157 X |
| 3,025,146 | 3/1962 | Runyan | 65/26 X |
| 3,459,504 | 8/1969 | Bracken et al. | 156/613 X |
| 3,540,870 | 11/1970 | Li | 65/DIG. 7 |
| 3,711,262 | 1/1973 | Keck et al. | 65/3 A X |
| 3,725,023 | 4/1973 | Parris | 65/32 X |
| 3,806,577 | 4/1974 | Flamenbaum et al. | 264/332 X |
| 3,823,995 | 7/1974 | Carpenter | 65/121 |
| 3,892,827 | 7/1975 | Keller et al. | 264/81 |
| 3,899,557 | 8/1975 | Dietze | 264/81 |
| 3,933,453 | 1/1976 | Burke et al. | 65/DIG. 7 |
| 3,957,474 | 5/1976 | Kobayashi et al. | 65/DIG. 7 |
| 3,980,456 | 9/1976 | Li | 65/18 |
| 4,045,198 | 8/1977 | Rau et al. | 65/3 A X |
| 4,065,280 | 12/1977 | Kau et al. | 65/3 A X |
| 4,090,055 | 5/1978 | King | 65/3 A X |
| 4,123,483 | 10/1978 | Nakahara et al. | 264/1 |

FOREIGN PATENT DOCUMENTS 51-50745  5/1976  Japan ......................................... 65/3 A Primary Examiner—William F. Smith
Attorney, Agent, or Firm—John T. O'Halloran; Peter C. Van Der Sluys

[57] ABSTRACT

High purity glass preforms for optical fiber manufacture are provided by depositing, using chemical vapor deposition techniques, high purity materials upon a removable hollow tubular deposition substrate of a radio frequency energy susceptible material. The substrate is subjected to radio frequency energy for the purposes of heating the substrate and the high purity glass-forming materials in vapor form are passed through the hollow substrate so that the heated substrate causes a reaction resulting in the deposition of the high purity materials on the inner surface of the substrate. The hollow tubular substrate is subsequently removed from the high purity glass materials to provide a cylinder of high purity glass. During the processing, the hollow substrate functions as a substrate, radio frequency energy susceptor and reaction enclosure. One embodiment of the invention contemplates that the substrate and the high purity glass materials will have different coefficients of thermal expansion so that after deposition of the glass-forming materials, the materials and the substrate may be simultaneously cooled by an amount sufficient to cause the substrate to break and fall away from the deposited glass-forming materials, leaving a cylinder of high purity material.

32 Claims, 14 Drawing Figures

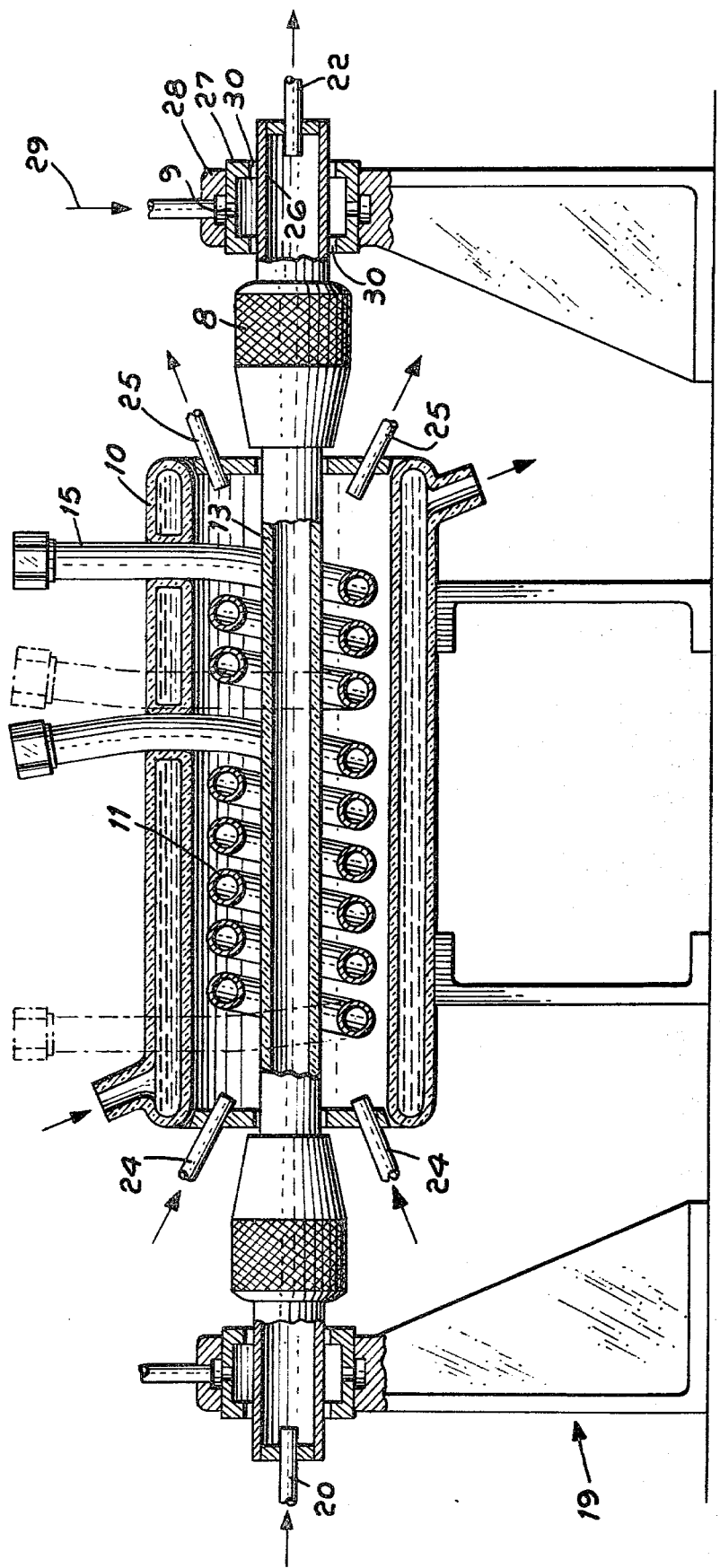

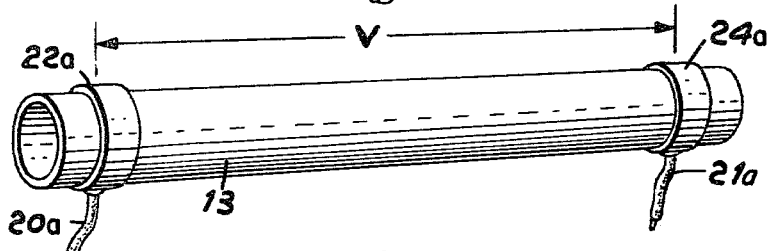
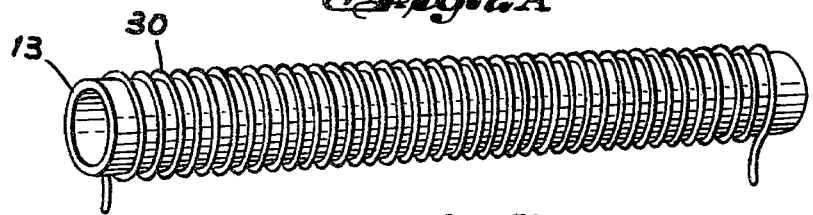
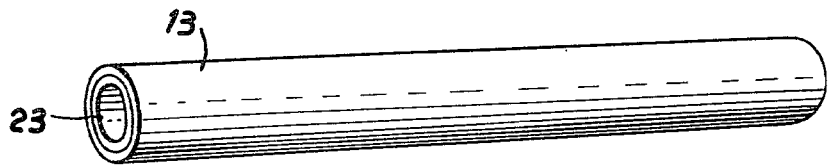
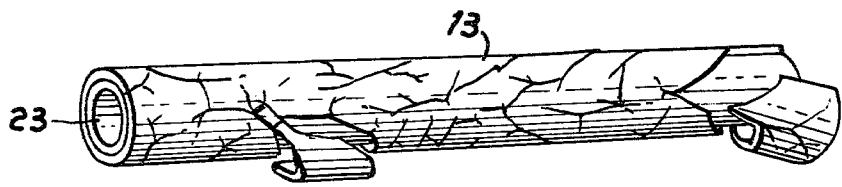
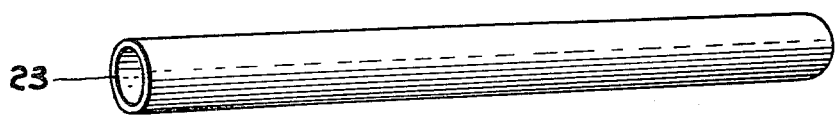
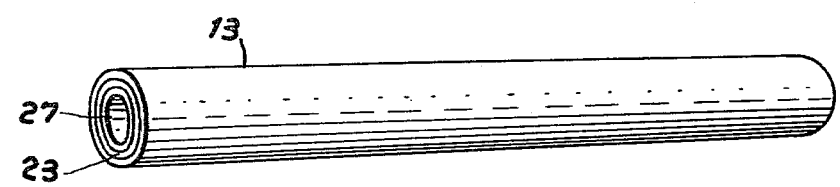
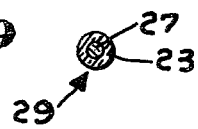

OPTICAL FIBER FABRICATION

BACKGROUND OF THE INVENTION

Various methods of chemical vapor deposition have been proposed for forming high purity optical fiber glasses having extremely low cation impurities and OH ions present in the glass structure. One method proposed for the manufacture of high purity optical fiber glass is that described within U.S. patent application Ser. No. 804,209 filed June 7, 1977 and entitled METHOD OF FABRICATING LOW LOSS OPTICAL FIBER USING A GRAPHITE TUBING.

This method uses a highly purified carbon deposition substrate for chemically distilling high purity materials on the inner surface thereof. The carbon is in the form of a cylinder and provides an environmental enclosure for the material as it is deposited. After a quantity of highly purified material is deposited on the inner surface of the carbon cylinder, the carbon is removed generally by grinding. The material can also be separated by deposition upon a split mold and removing the material from the mold.

SUMMARY OF THE INVENTION

An object of the present invention is to provide an improved method for forming a very high purity glass material on the inner surface of a tubular substrate, and separating the substrate from the high purity materials by combustion, grinding or utilizing the difference in thermal expansion of the high purity materials and the substrate to mechanically separate them. The invention also comprises methods for heating the substrate either uniformly, or in a controlled non-uniform manner along its extent to control the rate of deposition, the thermal properties of the materials including expansion during and after deposition, and to permit, where desired, the simultaneous deposition along the entire length of the region in which the glass tube is to be formed.

The invention further resides in the type of material used as a substrate along with various methods of heating and separating the substrate from the deposited material.

In one embodiment of the invention silica containing glasses are deposited within a hollow graphite cylinder and the silica glasses are removed by chilling the cylinder. The differential thermal expansion of the deposited silica glass and the graphite cause the graphite to contract at a greater rate than the silica glass. This puts the glass in compression and the graphite in tension. Silica glass is strong in compression, while graphite, if polycrystalline with the crystals randomly oriented, is weak in tension. Thus the graphite is cracked in many places and can be mechanically removed from the glass.

In another embodiment oxygen or oxygen containing gas such as air is introduced while the graphite is above the combustion temperature, thereby removing the graphite by combustion.

BRIEF DESCRIPTION OF THE DRAWINGS

FIG. 1A is a sectional view of an alternative glass deposition apparatus for use with the method of this invention with glasses which tend to slump;

FIG. 2 is a perspective view of an alternative apparatus used for electrically heating the substrate;

FIG. 2a is a perspective view of an alternate embodiment of the apparatus of FIG. 2;

FIG. 3 is a perspective view of the substrate of FIG. 1 with at least one layer of material deposited on the inner surface;

FIG. 4 is a perspective view of the substrate of FIG. 3 being treated for removal from the deposited material 3 by the cracking method;

FIG. 5 is the deposited material of FIG. 4 in solid form separate from the deposition substrate;

FIG. 6 is a cross section of the collapsed material of FIG. 5;

FIG. 6a is a cross section of the material of FIG. 6 after drawing into an optical fiber and being coated with a plastic outer layer;

FIG. 7 is a perspective view of the substrate of FIG. 1 with two layers of material deposited on the inner surface;

FIG. 8 is a cross section of the deposited material of FIG. 7 in solid form separate from the deposition substrate;

FIG. 9 is a cross section of the material of FIG. 8 after drawing into an optical fiber.

DESCRIPTION OF THE PREFERRED EMBODIMENT

Figure 1:
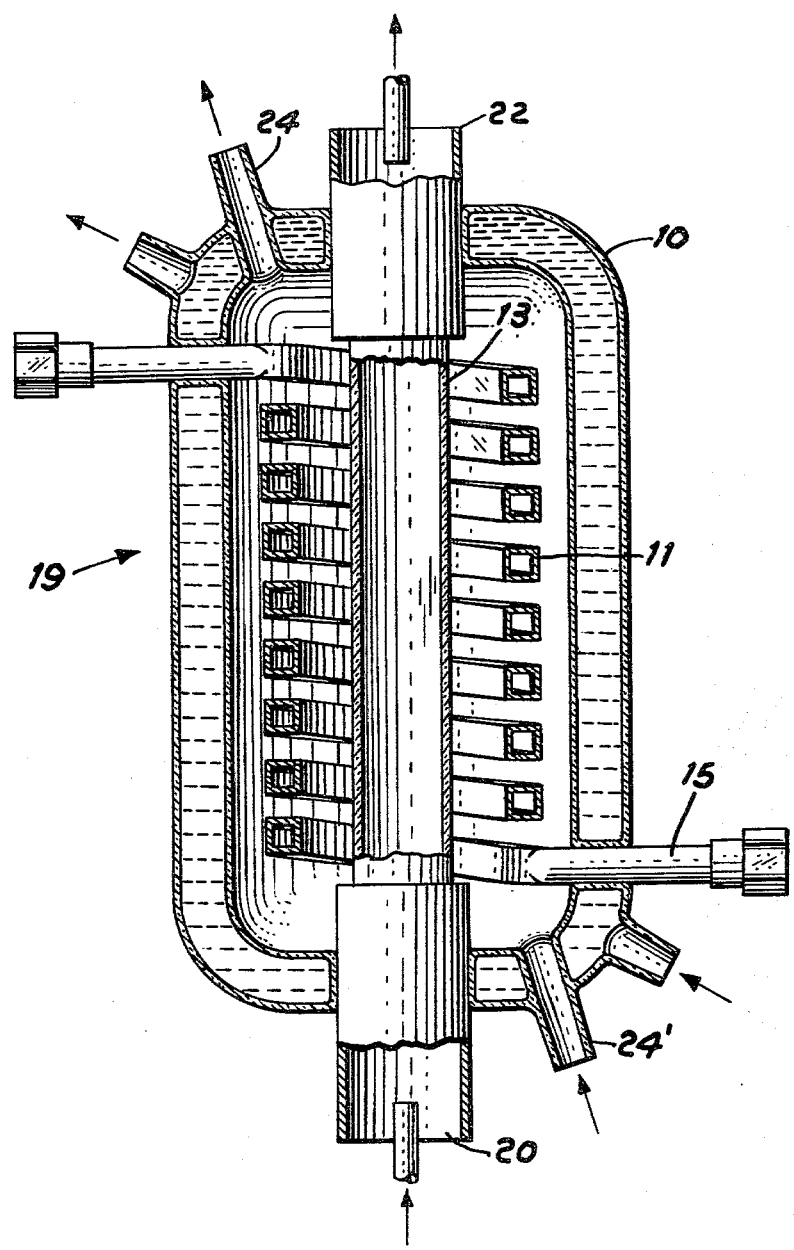
FIG. 1 is a sectional view of the glass deposition apparatus for use with the method of this invention.

FIG. 1 shows one form of glass deposition apparatus 19 used with this invention. It generally comprises a stand carrying a water cooled electrically insulating or poorly conducting jacket 10 and a hollow carbon cylinder 13 within the water cooled jacket 10, the carbon cylinder being held in water cooled mounts at each end. Between the water cooled jacket and the carbon cylinder is a water cooled high frequency induction coil 15 forming the primary of an induction furnace, with the secondary or receptor being the carbon cylinder 13. This is arranged so as to heat the carbon cylinder 13 during material deposition. Highly purified chemical reagents are introduced by oxygen or other gas entrainment through the inlet end 20 of the carbon cylinder mount, and the excess is removed at the exhaust end 22 of the carbon cylinder mount. Alternatively the reagents may be introduced at the upper end 22 and the excess removed at the lower end 20 of the carbon cylinder mount.

The spacing of the turns 11 of the induction coil 15 may be varied along its length to provide for proper heat distribution along the length of the carbon cylinder 13. Alternatively the induction coil 15 may be sectionalized as shown in FIG. 1A and each section fed power separately in order to control heat distribution along the length of the carbon cylinder 13.

The inner surface of the turns 11 of the induction coil 15 can be polished and treated to increase their infra-red reflectance, in order to reduce radiative heat transfer away from the carbon cylinder 13. Also, as shown in FIG. 1, the coil 15 may be made of rectangular rather than round section tubing to improve further the reflectance back to the carbon cylinder. In addition the coil 15 should be protected from oxidation by suitable treatment to reduce damage during subsequent oxidation of the carbon cylinder 13 as described below. One such treatment which would serve both purposes is a plating of metallic gold on the induction coil 15.

During the deposition step in the process the region between the water cooled jacket 10 and the carbon cylinder 13 is kept under a continuous purge of an inert gas by means of the gas inlets 24 and outlets 25.

The vertical orientation of the carbon cylinder 13 as shown in FIG. 1 is chosen to permit radially symmetrical deposition without the complication of rotating the deposition substrate. However, when depositing glasses which tend to slump in the gravitational field, an alternative form of apparatus shown in FIG. 1A may be used. In this case the glass deposition apparatus generally comprises a glass forming lathe 19 carrying a water cooled jacket 10 and the carbon cylinder 13 within the water cooled jacket 10. Between the water jacket 10 and the rotating carbon cylinder 13 is mounted the induction coil 15 similar to that used in the apparatus of FIG. 1. Highly purified chemical reagents are introduced by gas entrainment through the inlet 20 of the carbon cylinder mount and excess is removed at the opposite end 22. To further assure uniformity of glass deposit within the carbon cylinder 13 it is desirable with certain concentrations or flow of the entrained chemicals to reverse the direction of gas flow for part of the deposition time, the entraining gas entering at end 22 and leaving at end 20. When it is desired to control the deposition rate of the high purity glass materials, this may be accomplished by controlling the flow rate and concentration of the vapor containing the high purity glass materials. It is also contemplated that the high purity materials may be deposited as a soot on the inside surface, which soot is subsequently fused by raising the temperature of the substrate.

Because of the high temperature to which the carbon cylinder 13 must be heated to fuse into a glass such a deposited material as silica, and because carbon (and especially graphite) is a fair conductor of heat, it is necessary to provide some form of cooling for the bearings of the glass forming lathe 19. One arrangement for this is shown in FIG. 1A. A tubular extension 26 of the holder for the carbon tube 13 has fixed to it a ring 27 in the periphery of which are a series of radial holes 9 leading to a circular recess cut inside the ring 27. A fixed bearing 28, provided with a circular recess surrounding the radial holes 9 in the rotating ring 27, is fed with cooling air through the pipe 29, the air exhausting through a series of openings 30 between the ring 27 and the carbon tube holder 26 to which the ring 27 if fixed. In this manner the bearing and the holder 11 for the carbon tube 13 can be maintained at a safe operating temperature in spite of the heat conducted to them from the hot portions of the carbon tube 13.

In both the apparatus of FIG. 1 and of FIG. 1A the induction coil 15 may be mounted exterior to the water jacket 10 and give similar results. However, this introduces an added complication in that not only must the water jacket 10 be made of good insulating material such as fused silica, but also the water that is circulated must be of good purity and de-ionized to reduce its electrical conductivity to the point where the water will not seriously rob electrical power from the induction coil 15.

The graphitic form of the carbon can have two different crystal structures, the alpha which is hexagonal and the beta which is rhombohedral form. Natural graphite exists as a mixture of the alpha and beta forms while artificial graphite is purely alpha. The beta form is normally converted to the alpha by heating, so the alpha form is the one pertinent to this invention. Single crystals of this material have a low thermal expansion coefficient along an "a" axis and a relatively high coefficient of expansion along the "c" axis. Tubes of polycrystalline graphite are commercially available where the crystals are oriented at random, or nearly at random. In such material the expansion coefficient is intermediate between that along the "a" axis and "c" axis, and is far greater than that of fused silica. The method of this invention contemplates among other glasses, the deposition of pure fused silica, and silica containing compounds introduced to alter the refractive index but with resulting expansion coefficient not very different from that of pure fused silica. By keeping the temperature of the graphite at or not far from that at which the deposited glasses begin to soften it is possible to avoid serious thermal stresses both during and after the deposition process, and until the steps are taken to remove the graphite substrate as described below.

Once the deposition process is complete and a sufficient quantity of the glasses have been deposited on the inner surface of the graphite cylinder, the assembly of graphite and hollow glass cylinder can be cooled rapidly by a stream of gas or other convenient means. If the graphite cylinder or tube is polycrystalline and the crystals are randomly oriented, and if the graphite tube wall thickness is of the same order of magnitude as the wall thickness of the glass tube within, the graphite, which is weak in tension will crack without injuring the glass tube which is relatively strong in compression. The graphite fragments can then be separated from the glass tube.

Figure 1B:
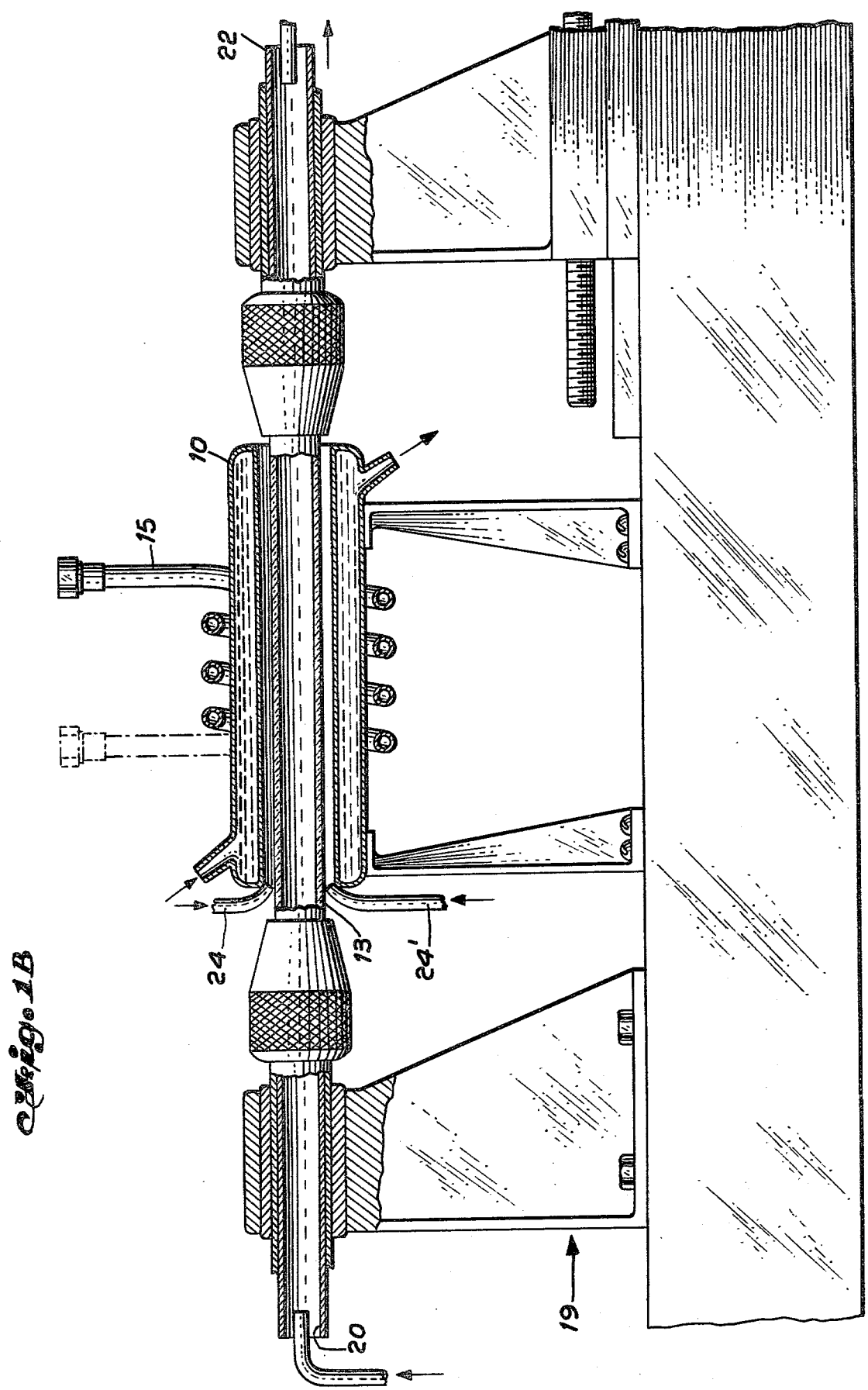
FIG. 1B is a sectional view of an alternative glass deposition apparatus for use with the method of this invention where the high frequency primary coil is mounted outside of the cooling jacket and is movable along the axis of the cylinder.

Alternatively the inert gas which has been flowing through the space between the graphite cylinder and the water cooled jacket during the deposition of glass inside the graphite tube can be replaced, at the conclusion of the deposition process with oxygen-containing gas while the graphite is maintained above its combustion temperature. In this way the graphite can be burned away at a controlled rate. At the same time a flow of air or other gas can be maintained through the inside of the glass cylinder within the graphite to keep the glass at a temperature below its softening point. Control of the burning rate of the graphite can be accomplished by control of the oxygen content or flow rate of the gas passing through the space outside of the graphite cylinder. Too high a flow rate and/or too high an oxygen content can result in an undesirable rate of combustion and consequent high temperature. Too low a flow rate of the oxygen containing gas, especially with low oxygen content, can result in oxygen depletion and thus a slower burning rate at the down stream end of the graphite tube. Reversing the direction of flow, (alternating the inlet between the gas ports 24 and the ports 25 in FIG. 1A) will result in symmetrical but not necessarily uniform combustion along the full length of the graphite cylinder. Additional control to achieve reasonable uniformity is conveniently accomplished by selective electrical heating along the length of the cylinder during the combustion process. This can be accomplished either by applying power selectively to sectionalized induction coils shown in FIG. 1A, or to a movable coil as shown in FIG. 1B. A coated cylinder 13 is shown in FIG. 3 with a layer of glass 23 on the inner surface applied by the method of this invention.

Figure 10:
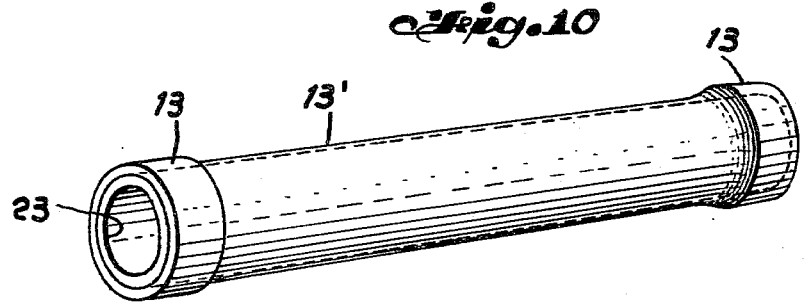
FIG. 10 is a perspective view of the substrate of FIG. 3 which has been partially removed from the deposited material by combustion.

It will be evident that a combination of the two methods of graphite removal described above can also be effective. If the burning-off process is carried out until the remaining graphite tube wall is quite thin, and this is followed by cooling the graphite and glass assembly so that the remaining graphite will crack, very effective graphite removal can be accomplished from even a relatively thin walled glass tube without injury to the glass. One example of the combination of the methods of graphite removal by burning the graphite tube to reduce its thickness prior to cooling the graphite and glass assembly to crack the remaining thin graphite wall can be seen by referring to FIG. 10. The graphite tube 13 containing the deposited glass 23 has a thinner portion 13' removed by combustion.

FIG. 5 shows the material 23 of FIG. 4 remaining after the graphite 13 has completely shattered.

Any number of resultant cylinders of high purity material 23 can be formed in this manner. For example, the outer cladding layer of glass on a glass optical fiber can be provided by the deposition of high purity silica material on a first graphite cylinder of a certain size. Once the graphite has been removed from the cylinder, the resultant silica cylinder can be used as the cladding layer for an optical fiber. The core material can be provided by depositing a higher refractive index material upon a new graphite cylinder to form a resultant cylinder of high purity material slightly smaller than the cylinder of the cladding material.

A completed optical fiber preform can then be fabricated by inserting the higher index of refraction cylinder within the lower index of refraction cylinder and heating to collapse and form a solid preform.

FIG. 6 shows the material 23 of FIG. 5 after heating to collapse to form a solid preform and FIG. 6a shows an optical fiber 25 where the material 23 of FIG. 6 comprises the core and a low refractive index plastic cladding material 26 is coated over the core.

FIG. 7 shows the graphite cylinder 13 with a second layer of high purity material 27 coated over the first material 23. FIG. 8 shows the first material 23 and the second material 27 after removing the graphite cylinder 23 and collapsing the materials 27, 23 into a solid preform 28.

FIG. 9 is an optical fiber 29 formed by heating and drawing the preform 28. The index of refraction of the first material 23 is selected to be lower than the index of refraction of the second material 27 to form a glass on glass type optical fiber 29 wherein the higher index material 27 forms the core and the lower index material 23 forms the cladding.

Because of the heat loss at the ends of the graphite tube due to thermal conduction to the end supports and the resulting lower temperature of the tube ends very little combustion of the graphite will occur at the ends. This is not important because at the lower temperature very little deposition of the materials forming the glass will occur at the ends. Moreover, in the case of silica or material high in silica, there will be little or no fusion into a glass, even where some deposit has occurred. The result is that the useful deposit of glass is confined to the main central body of the graphite tube, the same region which is burned away in the removal step of the process described above.

In the foregoing discussion it has been assumed that the starting graphite tube is a cylinder of uniform cross section. This is usually convenient, but in some cases it is preferable to start with a substrate tube which does not have a uniform cross section along its length, as an aid to heating control or removal control.

Carbon at high temperature is a powerful reducing agent and will react to some extent with the first layers of silica deposited within the graphite tube. Depending on time, temperature and other factors a thin layer of the silica may be reduced to a lower oxide or even to elemental silicon. Also under some conditions a layer of silicon carbide may form. Any such layers are contaminants and should be removed, as by grinding or etching or a combination of both, before the glass tube is collapsed and drawn into a fiber.

In the foregoing description the heating of the graphite cylinder has been by high frequency induction. Other means for keeping the graphite cylinder at a constant uniform temperature during the deposition process can be seen by referring to FIG. 2. The graphite cylinder 13 contains a pair of electrodes 20a and 21a one at either end of the cylinder 13 and electrically and mechanically attached by means of bands 22a and 24a to assure good electrical contact between the electrodes 20a and 21a and the cylinder 13. When the cylinder 13 is mounted in the glass apparatus of FIG. 1 and is under a steady stream of inert gas, a source of low DC voltage of high amperage is attached across electrodes 20a and 21a.

Other methods may also be employed to keep the graphite cylinder 13 at a high, constant and fairly uniform temperature during the deposition process. For example, the entire graphite cylinder 13 can be placed within a specially designed oven or the graphite cylinder per se could be wound with resistive heating wires. FIG. 2a shows an embodiment of the cylinder 13 wound with a winding of high melting point wire 30 such as tungsten or molybdenum around the graphite tube 13 to heat the tube 13. These metals are protected from oxidation during the deposition process by the inert atmosphere used to protect the graphite, as previously described.

Although carbon is normally preferred as material for the substrate tube, other refractory materials can be useful. However to retain the important advantage of the present invention the substrate material must remain rigid at a temperature at which the deposited glass or glasses will fuse. Zirconium oxide bonded with a very small quantity of kaolin or other clay, or with an organic binder such as gum tragacanth and fired at a high temperature is suitable. It can be made sufficiently rigid, yet weak in tension, by controlling the small quantity of binder and the firing temperature. Zirconium oxide is a non-conductor and must be heated by some external means. This can be electrical as shown in FIG. 3 as described above. Alternatively since it is quite stable in air and need not be surrounded by an inert gas in the deposition process, the entire length can be flame heated selectively or simultaneously, the water cooling jacket being dispensed with. The thermal expansion of such a polycrystalline zirconia tube is, like graphite, much larger than that of fused silica, so it can be removed by cracking as described above for graphite.

If it is desired to use high frequency induction heating, there can be added to the zirconium oxide approximately 10% of yttrium oxide, this combination being bonded preferably by an organic material. The organic material burns out when fired in a kiln, but at an appropriate firing temperature, well below the normal melting point, micro-sintering occurs and bonds the microcrystalline mass into a rigid structure. This will be recognized as the well known Nernst glower material. If heated, as by a flame, to a moderate red temperature it becomes electrically conducting, and can then serve as the secondary or receptor of a high frequency induction furnace just as in the case of graphite. Moreover this mixture, like pure zirconium oxide, is very stable in air so no protection by an inert atmosphere is required. Again as with pure zirconia or graphite, removal is accomplished by cracking as the temperature is reduced at the conclusion of the deposition process, or by mechanical grinding.

As with a carbon tube there will be some chemical reaction between the substrate and the outer layers of the deposited glass. In this case the principle compound formed is zirconium silicate which has a melting point substantially higher than the softening point of silica. Thus as with a carbon substrate, the deposited glass cylinder which is formed should have its outer surface cleaned by grinding and/or etching before being collapsed and drawn into a fiber.

For reasons of economy it may be desirable to recover for re-use the zirconia-yttria material which is substantially unaltered except for the thin layer of silicate which has formed on the inner surface of the substrate tube. This contamination can be largely removed by a suitable etch, the fragments crushed and formed again into a refractory tube.

Although the invention is directed to providing high purity materials for glass for optical fiber purposes, the invention also finds application wherever such high purity glasses may be required.

I claim:

1. A method for forming a high purity glass preform, comprising the steps of:
    providing a removable hollow tubular deposition substrate of a radio frequency energy susceptible material;
    enclosing said substrate as a susceptor inside a primary high-frequency induction coil having a plurality of turns;
    varying the distance between said plurality of turns;
    subjecting the substrate to radio frequency energy to heat said substrate;
    passing high purity glass-forming materials in vapor form through the hollow substrate wherein the heat from the substrate causes a reaction resulting in the depositing of the high purity materials on the inner surface of the substrate; and
    subsequently removing the hollow tubular substrate from the high purity material to provide a cylinder of high purity material, whereby the hollow substrate functions as a substrate, radio frequency energy susceptor and reaction enclosure.

2. The method of claim 1 wherein the depositing of high purity material is performed substantially simultaneously along all parts of the length of the substrate.

3. The method of claim 1 wherein the high purity material deposits as a fused glass.

4. The method of claim 1 wherein the high purity material deposits as a soot and additionally comprising the step of fusing the soot by raising the temperature of the substrate.

5. The method of claim 1 additionally comprising the step of controlling the deposition rate at different points along the length of the substrate.

6. The method of claim 5 wherein the step of controlling the deposition rate comprises the step of controlling the temperature at the different points.

7. The method of claim 5 wherein the step of controlling the deposition rate comprises the step of controlling the flow rate and concentration of the vapor containing the high purity glass materials.

8. The method of claim 1 wherein the first step includes selecting a substrate that comprises a graphitic carbon cylinder.

9. The method of claim 1 wherein the first step includes selecting a substrate that comprises a high temperature ceramic.

10. The method of claim 1 wherein the first step includes selecting a substrate that comprises a refractory material which becomes electrically conducting at elevated temperatures.

11. The method of claim 1 additionally comprising the steps of repeating the aforementioned steps using different glass forming materials and a different size substrate to obtain another cylinder of high purity material.

12. The method of claim 11 wherein one cylinder comprises silicon oxide and the other cylinder comprises an index of refraction modifier.

13. The method of claim 11 including the steps of inserting one cylinder within the other cylinder and heating said cylinders to collapse them and form a fiber optic preform.

14. The method of claim 13 including the step of heating the fiber optic preform to its softening temperature and drawing the preform into an optical fiber.

15. The method of claim 1 wherein the step of removing the substrate comprises heating the deposition substrate to incandescence in the presence of oxygen-containing gas whereby the substrate is removed by oxidation.

16. A method for forming a high purity glass preform, comprising the steps of:
    providing a disposable deposition substrate in the form of a hollow cylinder of a material having a first thermal expansion coefficient;
    depositing high purity glass forming materials on the inner surface of the substrate using chemical vapor deposition techniques, said materials having a second thermal expansion coefficient lower than the first expansion coefficient of the substrate material;
    simultaneously heating the disposable substrate and deposited glass forming materials during the depositing step; and
    subsequently cooling the deposited glass forming materials and substrate by an amount sufficient to cause the substrate to crack and fall away from the deposited glass forming material to provide a cylinder of high purity material.

17. The method of claim 16 wherein the depositing of high purity material is performed substantially simultaneously along all parts of the length of the substrate.

18. The method of claim 16 wherein the high purity material deposits as a soot and additionally comprising the step of fusing the soot by raising the temperature of the substrate.

19. The method of claim 16 wherein the step of heating comprises passing an electric current through the substrate to heat it by means of resistive heating.

20. The method of claim 16 wherein the step of heating the substrate comprises enclosing it in a high temperature furnace.

21. The method of claim 16 wherein the first step includes selecting a substrate that comprises a graphitic carbon cylinder.

22. The method of claim 21 wherein the step of heating the substrate comprises enclosing the substrate as a susceptor inside a primary high frequency induction coil having a plurality of turns.

23. The method of claim 16 wherein the first step includes selecting a substrate that comprises a high temperature ceramic.

24. The method of claim 16 wherein the first step includes selecting a substrate that comprises a refractory material which becomes electrically conducting at elevated temperatures.

25. The method of claim 16 wherein the step of cooling comprises the step of subjecting said substrate deposited glass forming materials to a cooled stream of gas.

26. The method of claim 25 wherein the cooling step includes selecting a cooling gas that is an inert gas.

27. The method of claim 16 additionally comprising the steps of repeating the aforementioned steps using different glass forming materials and a different size substrate to obtain another cylinder of high purity material.

28. The method of claim 26 including the steps of inserting one cylinder within the other cylinder and heating said cylinders to collapse them and form a fiber optic preform.

29. The method of claim 28 including the step of heating the fiber optic preform to its softening temperature and drawing the preform into an optical fiber.

30. A method for forming a high purity glass preform, comprising the steps of:
providing a removable hollow tubular deposition substrate of a radio frequency energy susceptible material;
enclosing the substrate as a susceptor inside a primary high-frequency induction coil, having a plurality of turns;
subjecting said substrate to radio frequency energy to heat said substrate;
radiating heat back to the substrate by providing the induction coil with a surface which reflects a substantial amount of heat back to the heated substrate;
passing high purity glass-forming materials in vapor form through the hollow substrate wherein the heat from the substrate causes a reaction resulting in the depositing of high purity materials on the inner surface of the substrate; and
subsequently removing the hollow tubular substrate from the high purity material to provide a cylinder of high purity material, whereby the hollow substrate functions as a substrate, radio frequency energy susceptor and reaction enclosure.

31. A method for forming a high purity glass preform, comprising the steps of:
providing a disposable deposition substrate in the form of a hollow cylinder of a graphitic carbon having a first thermal expansion coefficient;
depositing high purity glass-forming materials on the inner surface of the substrate using chemical vapor deposition techniques, said materials having a second thermal expansion coefficient lower than the first expansion coefficient of the substrate material;
enclosing the substrate as a susceptor inside a primary high-frequency induction coil having a plurality of turns for simultaneously heating the disposable substrate and the deposited glass-forming materials during the depositing step by subjecting said substrate and deposited material to radio frequency energy;
varying the spacing between the turns of the primary high-frequency induction coil in order to control the heating of the substrate along its length; and
subsequently cooling the deposited glass-forming materials and substrate by an amount sufficient to cause the substrate to break and fall away from the deposited glass-forming material to provide a cylinder of high purity material.

32. A method for forming a high purity glass preform, comprising the steps of:
providing a disposable deposition substrate of an oxidizable material in the form of a hollow cylinder of a material having a first thermal expansion coefficient;
depositing high purity glass-forming materials on the inner surface of the substrate, said materials having a second thermal expansion coefficient lower than the first expansion coefficient of the substrate material;
simultaneously heating the disposable substrate and deposited glass-forming materials during the depositing step;
heating the substrate, prior to cooling, to incandescence in the presence of oxygen to oxidize and remove a portion of the substrate; and
subsequently cooling the deposited glass-forming materials and substrate by an amount sufficient to cause the remaining substrate to crack and fall away from the deposited glass-forming material to provide a cylinder of high purity material.

* * * * *